United States Patent
Moll et al.

(10) Patent No.: US 11,742,677 B2
(45) Date of Patent: Aug. 29, 2023

(54) ENERGY EFFICIENT BATTERY CHARGER

(71) Applicant: International Business Machines Corporation, Armonk, NY (US)

(72) Inventors: Georges-Henri Moll, Roquefort les Pins (FR); Philippe Kaplan, Le Rouret (FR); Olivier Oudot, Vallauris (FR); Xavier Nodet, Antibes (FR)

(73) Assignee: International Business Machines Corporation, Armonk, NY (US)

( * ) Notice: Subject to any disclaimer, the term of this patent is extended or adjusted under 35 U.S.C. 154(b) by 144 days.

(21) Appl. No.: 17/185,433

(22) Filed: Feb. 25, 2021

(65) Prior Publication Data
US 2022/0271547 A1    Aug. 25, 2022

(51) Int. Cl.
H02J 7/00    (2006.01)
H02J 9/00    (2006.01)

(52) U.S. Cl.
CPC .......... H02J 7/0045 (2013.01); H02J 7/0031 (2013.01); H02J 7/0071 (2020.01); H02J 9/007 (2020.01)

(58) Field of Classification Search
CPC ...... H02J 7/0031; H02J 7/0045; H02J 7/0071; H02J 9/007
USPC .................................. 320/107, 140, 155, 158
See application file for complete search history.

(56) References Cited

U.S. PATENT DOCUMENTS

| 4,080,583 A * | 3/1978 | Fujita | ................... | H01H 43/104 335/74 |
| 4,209,736 A * | 6/1980 | Reidenbach | ...... | H02J 7/007 194 320/152 |
| 9,020,648 B2 | 4/2015 | Doljack | | |
| 9,035,604 B2 | 5/2015 | Schwartz et al. | | |
| 9,805,890 B2 | 10/2017 | Doljack | | |
| 2008/0151462 A1* | 6/2008 | Mason | ................... | H01H 71/24 361/152 |
| 2011/0181380 A1* | 7/2011 | Iwata | ................... | H01H 23/168 335/63 |

(Continued)

FOREIGN PATENT DOCUMENTS

CN    201742137 U    2/2011

OTHER PUBLICATIONS

Berkeley Lab, "Standby Power Summary Table," https://standby.lbl.gov/data/summary-table/, accessed Dec. 1, 2020, 9 pgs.

(Continued)

*Primary Examiner* — Edward Tso
*Assistant Examiner* — Aaron Piggush
(74) *Attorney, Agent, or Firm* — Kelli D. Morin (57) ABSTRACT

Provided is a battery charger. The battery charger comprises a power converter, an input power connector, and an output power connector. The input power connector is configured to be connected to a power source such that the input power connector is arranged between the power converter and the power source. The output power connector is configured to be connected to an electronic device such that the output power connector is arranged between the power converter and the electronic device. The battery charger further includes a power control relay configured to connect the power converter to the input power connector. The battery charger further includes a timer device configured to disconnect the power converter from the input power connector after a predetermined amount of time has elapsed.

20 Claims, 4 Drawing Sheets

(56) References Cited

U.S. PATENT DOCUMENTS

2013/0093242 A1* 4/2013 Mok .................. H02J 9/005
  307/115
2017/0264115 A1 9/2017 Bencuya

OTHER PUBLICATIONS

Unknown, "Global smartphone sales," https://www.planetoscope.com/electronique/728-ventes-mondiales-de-smartphones.html, accessed Dec. 1, 2020, 1 pg.

Wikipedia, "Lithium-ion battery," https://en.wikipedia.org/wiki/Lithium-ion_battery, accessed Dec. 1, 20, 33 pgs.

* cited by examiner

ENERGY EFFICIENT BATTERY CHARGER

BACKGROUND

The present disclosure relates generally to the field of battery chargers for rechargeable batteries, and more particularly to energy efficient battery chargers.

Battery chargers convert power that is provided by a source into power that is storable by a rechargeable battery. A battery charger delivers the converted power to a rechargeable battery when electric current is forced through the battery charger. Accordingly, to convert and provide power to a rechargeable battery, the battery charger must be electrically connected to both the power source and to the rechargeable battery.

SUMMARY

Embodiments of the present disclosure include a battery charger. The battery charger includes a power converter, an input power connector, and an output power connector. The input power connector is configured to be connected to a power source such that the input power connector is arranged between the power converter and the power source. The output power connector is configured to be connected to an electronic device such that the output power connector is arranged between the power converter and the electronic device. The battery charger further includes a power control relay configured to connect the power converter to the input power connector. The battery charger further includes a timer device configured to disconnect the power converter from the input power connector after a predetermined amount of time has elapsed. By disconnecting the power converter from the input power connector after the predetermined amount of time has elapsed, the battery charger can prevent the power source from providing power when no device is connected to the battery charger. Accordingly, the battery charger can improve energy efficiency.

Embodiments of the present disclosure further include a battery charger. The battery charger includes a first input power connector configured to be connected to a power source and a first output power connector configured to be connected to an input power connector of a power converter. The battery charger further includes a power control relay configured to connect the power source to the power converter. The battery charger further includes a timer device configured to disconnect the power source from the power converter after a predetermined amount of time has elapsed. The battery charger further includes a second input power connector configured to be connected to an output power connector of the power converter and a second output power connector configured to be connected to a device. Current passing from the device to the power converter causes the power control relay to connect the power source to the power converter. Because current passing from the device to the power converter causes the power control relay to connect the power source to the power converter, the battery charger can prevent the power source from providing power when no device is connected to the battery charger. Accordingly, the battery charger can improve energy efficiency.

Embodiments of the present disclosure further include a method of operating a battery charger. The method includes establishing a connection between a power source and an input power connector of a power converter by passing current from a device through a power control relay. Establishing the connection includes passing current through a timer switch. The timer switch is configured to open after current has passed through the timer switch for a predetermined amount of time. Opening the timer switch disconnects the power source from the input power connector of the power converter. By establishing the connection between the power source and the input power connector by passing current through a timer switch which disconnects the power source from the input power connector after a predetermined amount of time has passed, performing the method causes the battery charger to automatically disconnect the power source from the device. Accordingly, the method can improve energy efficiency.

Embodiments of the present disclosure further include a method of operating a battery charger. The method includes disconnecting a power source from an input power connector of a power converter by preventing current from passing from a device through a power control relay to the power converter. The power control relay connects the power source and the input power connector of the power converter. A timer switch is arranged in series with the power control relay such that the timer switch prevents current from passing through the power control relay when the timer switch is opened. Because the timer switch prevents current from passing through the power control relay when the timer switch is opened, performing the method causes the battery charger to automatically disconnect the power source from the device. Accordingly, the method can improve energy efficiency.

Embodiments of the present disclosure further include a battery charger. The battery charger includes a power control relay and a timer switch. The power control relay is movable between a first position, wherein the power control relay connects a power source to an input power connector of a power converter, and a second position, wherein the power control relay prevents connection of the power source to the input power connector of the power converter. The timer switch is movable between a third position, wherein the timer switch enables current to flow through the power control relay to move the power control relay to the first position, and a fourth position, wherein the timer switch prevents current from flowing through the power control relay to move the power control relay to the second position. The timer switch moves from the third position to the fourth position after a predetermined amount of time has elapsed. The predetermined amount of time begins when the power control relay is moved into the first position. Because the timer switch causes the power control relay to prevent connection of the power source to the power converter after a predetermined amount of time, the battery charger automatically disconnects the power source from the power converter after the predetermined amount of time. Accordingly, the battery charger can improve energy efficiency.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of battery chargers for rechargeable batteries, and in particular to energy efficient battery chargers. While the present disclosure is not necessarily limited to such applications, various aspects of the disclosure may be appreciated through a discussion of various examples using this context.

In 2018, an estimated 7.7 billion smartphones were active. That is more than the number of people living on earth. Moreover, smartphones are just one of the electronic devices (also referred to herein as simply "devices") that users own and utilize on a regular basis. Such electronic devices typically contain a rechargeable lithium-ion battery in which energy is periodically replenished to maintain the electrical functionalities of the device. More particularly, such devices must be connected periodically to an energy source, via a battery charger, to replenish the energy stored in the battery. Replenishing the energy stored in the battery is commonly referred to as "charging" the battery. Connecting a device to an energy source is commonly referred to as "plugging in" the device. Similarly, connecting a battery charger to an energy source is commonly referred to as "plugging in" the battery charger. Disconnecting a device or a battery charger from an energy source is commonly referred to as "unplugging." Notably, these concepts and terms apply to traditional cord charging, wherein physical conductive contact is used to establish electrical connections and provide electricity to devices, as well as to "wireless charging" or "cordless charging," wherein electromagnetic induction is used to establish connections and provide electricity to devices.

Battery chargers typically include one or more cords which extend the electronic connection away from the energy source. This is for convenience so that the battery charger can provide access for the device to the energy source without having to be located at the same location as the energy source. For example, a cord of a battery charger can enable a device to be plugged in at a location that is spaced apart from the location of the electrical outlet in the wall.

When a device is connected to the energy source via the battery charger, the battery charger transmits power from the energy source into the battery. However, even when a device is not connected to the battery charger, the battery charger still pulls some small amount of power from the energy source. This is problematic because many device users often or nearly always leave their battery chargers connected to the energy source even when they do not have a device connected to the energy source. Leaving battery chargers plugged in is largely a matter of convenience. If the user will be plugging their battery charger back into the same outlet to charge a device again later, it is simply easier to leave the battery charger plugged in. Moreover, in instances where the outlet is obscured or is difficult to reach, or instances where the battery charger is purposefully obscured for aesthetic reasons, it is even more likely that the user will leave the battery charger plugged in for convenience.

For example, a user may utilize an outlet that is located behind their bed for a battery charger to charge their smartphone on their nightstand while they sleep each night. The cord of the battery charger enables the user to position their smartphone on their nightstand even though they are accessing the outlet that is located behind their bed. The user is unlikely to reach behind their bed each morning to unplug the battery charger from the outlet and reach behind their bed again each evening to plug the battery charger back into the outlet. Instead, the user will almost certainly leave the battery charger plugged into that outlet and simply connect and disconnect their device from the cord of the battery charger that is accessible at their nightstand.

The issue is that because each battery charger that is left plugged in pulls some amount of power and because there are billions of such battery chargers in the world, the cumulative amount of power that is wasted by such battery chargers that are not actively charging devices is significant. For example, on average, a plugged in phone charger that is not charging a smartphone consumes 0.26 watts. If half of the chargers in the world are left plugged in with no smartphone plugged in to charge, approximately 1 gigawatt of power is wasted. This scales up to around 9 terawatt hours of power wasted per year. It is advantageous to reduce the amount of power wasted, especially by battery chargers that users want to leave plugged in for convenience.

Some battery chargers have been developed to cut off the main power when the battery of a device is fully charged. Continuing to supply power to a battery that is fully charged simply wastes the power, because the battery cannot be charged above its full capacity. However, such battery chargers do not include a means for automatically reconnecting the battery charger when the device is plugged in again.

Accordingly, it is advantageous to develop a battery charger which is able to automatically disconnect the main power to a battery charger when there is no device plugged into the battery charger and to automatically reconnect the main power to the battery charger when there is a device plugged back into the battery charger. Such a battery charger will retain the convenience of being left plugged into the energy source and will also conserve energy by preventing power from being transmitted from the energy source to the battery charger when no device is plugged in to be charged.

Embodiments of the present disclosure may overcome the above, and other, problems by using a power control relay and a timer switch to control the electrical connection of the energy source to the power converter of the battery charger. As explained in further detail below, the battery charger disclosed herein connects the energy source to the power converter by way of the power control relay. However, the power control relay only enables the connection if current is flowing through the power control relay. Current only flows through the power control relay if a device is connected to the battery charger and the timer switch is closed.

To initiate the flow of current through the power control relay, residual energy/charge that is stored in the battery of the device causes current (referred to herein as "residual current") to flow into the battery charger when the device is attached to the battery charger. The residual current flows through the power control relay and through the timer switch. By flowing through the power control relay, the residual current causes the power control relay to connect the energy source to the power converter. By flowing through the timer switch, the residual current also starts the predetermined amount of time for which the timer switch will remain closed. Accordingly, by connecting the device to the battery charger, the battery charger automatically connects the power converter of the battery charger to the energy source.

The default position of the timer switch is closed, but the timer switch is opened after the predetermined amount of time elapses. By opening the timer switch, current is prevented from continuing to pass through the power control relay. Accordingly, when the predetermined amount of time elapses, the battery charger automatically disconnects the power converter of the battery charger from the energy source. The power converter of the battery charger is automatically disconnected from the energy source after the predetermined amount of time regardless of whether the device is still plugged into the battery charger. When the timer switch opens, a reset amount of time begins. The timer switch automatically closes again when the reset amount of time has elapsed.

After the reset amount of time has elapsed, if the device is no longer plugged into the battery charger, then there is no residual current in the battery of the device to reestablish the connection to reinitiate the flow of the current through the power control relay. Thus, the power converter of the battery charger will remain disconnected from the energy source. However, if the device is still plugged into the battery charger, then the residual current in the battery of the device will automatically reestablish the connection to reinitiate the flow of the current through the power control relay.

In the event that the battery of the device is completely discharged and does not have sufficient residual current to initiate the flow of current through the power control relay even when it is plugged into the battery charger, a manual power switch can be operated to mechanically cause the power control relay to connect the energy source to the power converter without requiring current to flow through the power control relay. After manually establishing this connection, the battery charger operates in the same manner described above.

Accordingly, the battery charger automatically disconnects the power converter from the energy source periodically. If there is no device attached to the battery charger, then the power converter remains disconnected from the energy source, and energy is conserved rather than continuing to flow into the power converter. If there is a device attached to the battery charger, then the power converter is automatically reconnected to the energy source, and the battery resumes charging. The user is not required to act any differently and no convenience is lost, but the battery charger has improved the energy efficiency of the user's actions.

It is to be understood that the aforementioned advantages are example advantages and should not be construed as limiting. Embodiments of the present disclosure can contain all, some, or none of the aforementioned advantages while remaining within the spirit and scope of the present disclosure.

Figure 1:
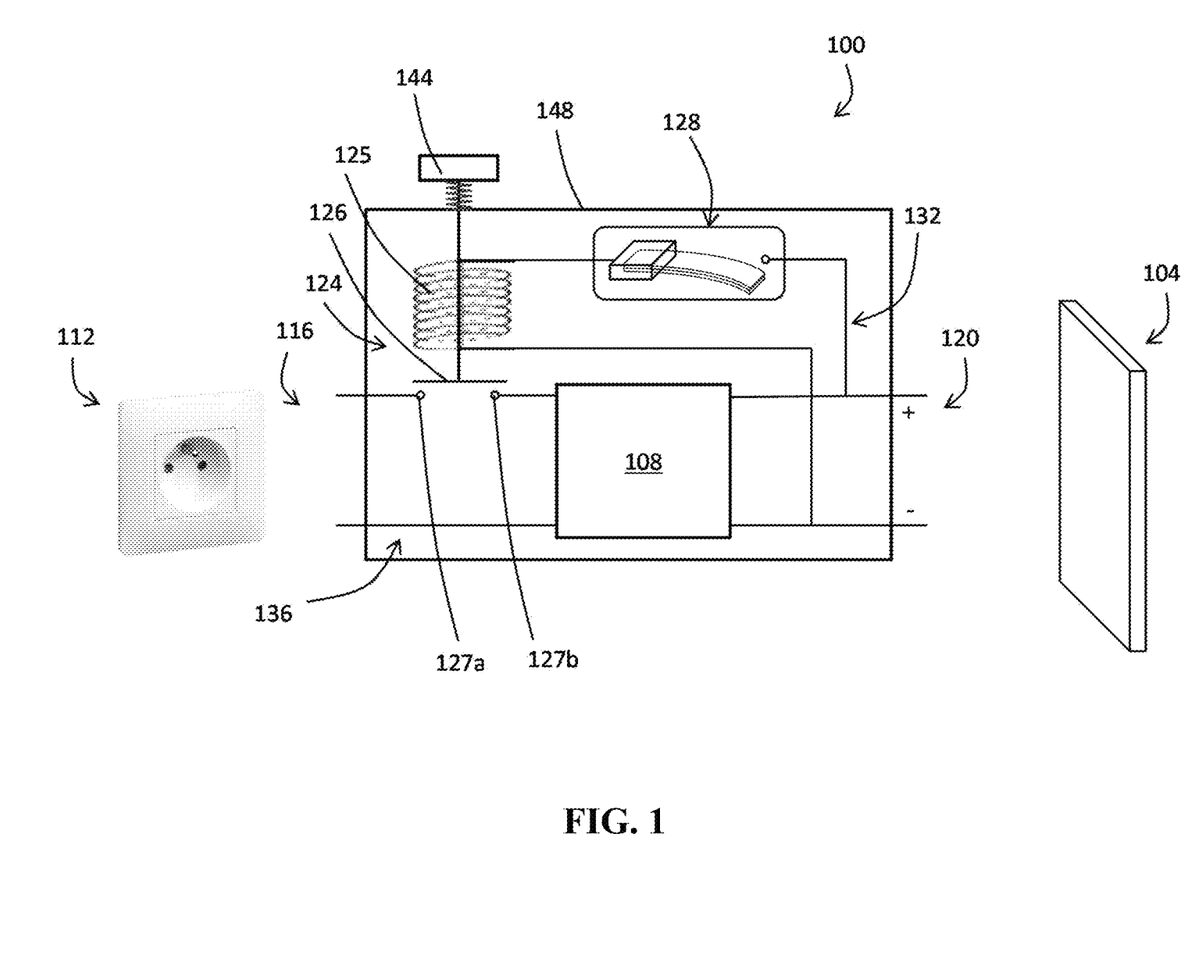
FIG. 1 illustrates a schematic diagram of an example battery charger, in accordance with embodiments of the present disclosure.

Turning now to the figures, FIG. 1 depicts a battery charger 100 according to at least some illustrative embodiments of the present disclosure. The battery charger 100 is a device which transfers energy into a rechargeable battery of a device 104 by forcing an electric current through it.

The battery charger 100 includes a power converter 108, which converts power that is provided by a power source 112 into power that is storable by the rechargeable battery of the device 104. In the illustrative embodiment discussed herein, the power source 112 is an alternating current (AC) power wall socket such as is commonly found in buildings and at other sites. In the illustrative embodiment discussed herein, the rechargeable battery of the device 104 is a lithium-ion battery such as is commonly found in rechargeable consumer electronic devices. In electronics, it is common to refer to a circuit that is powered by a DC voltage source such as a battery or the output of a DC power supply as a DC circuit even though what is meant is that the circuit is DC powered. For example, devices having lithium-ion batteries are chargeable to store energy and are configured such that this functionality is powered by a DC voltage source. Accordingly, in the illustrative embodiment discussed herein, the power converter 108 is an AC/DC converter. In some alternative embodiments of the present disclosure it may be possible for the power converter 108 to convert DC power into AC power. Such embodiments may be useful for applications storing AC power. In some alternative embodiments of the present disclosure it may be possible for the power converter 108 to act as a voltage converter to change the voltage of the power source 112.

The battery charger 100 further includes an input power connector 116 and an output power connector 120. The input power connector 116 is configured to be connected to the power source 112 so as to enable power to be transferred from the power source 112 to the battery charger 100. Accordingly, the term "input power connector" can refer to mechanical, electrical, and/or electromechanical connections that enable this transfer. In the illustrative embodiment discussed herein, the input power connector 116 is an AC power plug which is configured to fit matingly with the AC power wall socket to enable AC power from the power source 112 to be transferred to the battery charger 100. The output power connector 120 is configured to be connected to the device 104 so as to enable power to be transferred from the battery charger 100 to the device 104. Accordingly, the term "input power connector" can refer to mechanical, electrical, and/or electromechanical connections that enable this transfer. In the present disclosure, the output power connector 120 is a DC power plug which is configured to fit matingly with a receiving socket of the device 104.

The battery charger 100 further includes a power control relay 124. In the illustrative embodiment discussed herein, the power control relay 124 is an electromagnetic switch, including a solenoid 125 and an armature 126, that converts electrical energy into mechanical displacement. More specifically, when an electric current is passed through the solenoid 125, a magnetic field is generated which displaces the armature 126 relative to its initial position. In the displaced position, the armature 126 conductively connects two contacts 127a, 127b. When the current is removed, the armature 126 returns to its initial position and the connection between the contacts 127a, 127b is broken.

In alternative embodiments of the present disclosure, the power control relay 124 need not be an electromagnetic relay. For example, the power control relay 124 can be a solid-state relay, which uses semiconductor properties for control without relying on mechanically moving parts.

The battery charger 100 further includes a timer device 128. The timer device 128 is an electrically operated switch alternatingly configurable in an open state and a closed state. When the timer device 128 is in the open state, the circuit that includes the timer device 128 is incomplete and the timer device 128 off. When the timer device 128 is in the closed state, the circuit that includes the timer device 128 is complete and the timer device 128 is on. In the illustrative embodiment discussed herein, the default state of the timer device 128 is closed such that the timer device 128 is "on".

The timer device 128 is further configured such that when current is passing through the timer device 128, the timer device 128 automatically turns off after a predetermined amount of time has elapsed from when current began to pass through the timer device 128. For example, if current begins to pass through the timer device 128 at time t0 and the predetermined amount of time is t1, then the timer device 128 automatically turns off at time t0+t1. When the timer device 128 turns off, the timer device 128 moves to the open state and the circuit that includes the timer device 128 is made incomplete. The operation of the timer device 128 in the context of the battery charger 100 is described in further detail below.

Two circuits are arranged in the battery charger 100. A relay circuit 132 includes the output power connector 120, the solenoid 125 of the power control relay 124, and the timer device 128. A secondary circuit 136 includes the input power connector 116, the armature 126 of the power control relay 124, the power converter 108, and the output power connector 120. Accordingly, the power control relay 124 is involved in both the relay circuit 132 and the secondary circuit 136.

The relay circuit 132 is arranged and configured such that when a device 104 which has any electrical energy stored within its rechargeable battery is connected to the output power connector 120, contact is made with both the positive and negative terminals of the output power connector 120, and the relay circuit 132 is completed. Completing the relay circuit 132 causes current to pass through the solenoid 125 of the power control relay 124 and through the timer device 128. As noted above, the default state of the timer device 128 is closed. As such, completing the relay circuit 132 does not turn the timer device 128 on, because it is already on. Instead, the time at which the relay circuit 132 is completed serves as the start time (time t0) from which the predetermined amount of time elapses. In contrast, because completing the relay circuit 132 causes current to flow through the solenoid 125 to displace the armature 126 from its initial position, completing the relay circuit 132 does cause the power control relay 124 to be turned on. Thus, the time at which the relay circuit 132 is completed is also the time at which the armature 126 is displaced.

When the power control relay 124 is turned on and the armature 126 is displaced from its initial position, the armature 126 is brought into contact with the two contacts 127a, 127b which electrically connects the input power connector 116 to the power converter 108. While there may be an insignificant time delay during which the armature 126 is physically displaced from the initial position into the displaced position, the time at which the relay circuit 132 is completed is also approximately the same time at which the power converter 108 is connected to the input power connector 116. Thus, the time at which the power converter 108 is connected to the input power connector 116 is approximately equal to the start time from which the predetermined amount of time elapses.

If the input power connector 116 is connected to a power source 112, the secondary circuit 136 is completed when the power control relay 124 is turned on by the relay circuit 132. When the secondary circuit 136 is completed, current passes from the power source 112 through the input power connector 116, through the power converter 108, and through the output power connector 120 to the device 104 to charge the rechargeable battery of the device 104. In other words, if the battery charger 100 is connected to a power source 112, then connecting the battery charger 100 to a device 104 automatically connects the secondary circuit 136 by connecting the relay circuit 132.

Once the predetermined amount of time has elapsed from the completion of the relay circuit 132, the timer device 128 automatically opens and turns off. As a result, the relay circuit 132 is made incomplete and current ceases to flow through the solenoid 125 such that the power control relay 124 is also turned off and the armature 126 returns to its initial position. In its initial position, the armature 126 no longer connects the contacts 127a, 127b. Thus, the secondary circuit 136 is also made incomplete. When the secondary circuit 136 is made incomplete, current does not pass from the power source 112 to the power converter 108. Accordingly, once the predetermined amount of time has elapsed, power from the power source 112 ceases to flow into the battery charger 100. In other words, once the predetermined amount of time has elapsed, the power converter 108 is automatically electrically disconnected from the power source 112.

If the device 104 is still connected to the output power connector 120, then the relay circuit 132 will be recompleted automatically in the manner described above. More specifically, if the device 104 is still connected to the output power connector 120, then the relay circuit 132 will be recompleted automatically after an amount of time has elapsed that is sufficient to enable the timer device 128 to be reset. This amount of time can be referred to as the reset time. If the input power connector 116 is still connected to the power source 112, then the secondary circuit 136 will be recompleted automatically by the recompletion of the relay circuit 132.

In contrast, if the device 104 is no longer connected to the output power connector 120, then the relay circuit 132 will not be recompleted automatically. Instead, the relay circuit 132 will remain incomplete, which will cause the secondary circuit 136 to remain incomplete, which will prevent power from flowing from the power source 112 into the battery charger 100. Accordingly, the battery charger 100 prevents electricity from being wasted when no device is connected to the power converter 108.

In the illustrative embodiment discussed herein, the timer device 128 can include a bimetallic strip, which is configured to convert a temperature change into mechanical displacement. The bimetallic strip is made up of different materials which expand at different rates as they are heated. The different expansion rates cause the strip to bend one way relative to its initial position if it is heated above its initial temperature and to bend the opposite way relative to its initial position if it is cooled below its initial temperature.

Figure 2A:
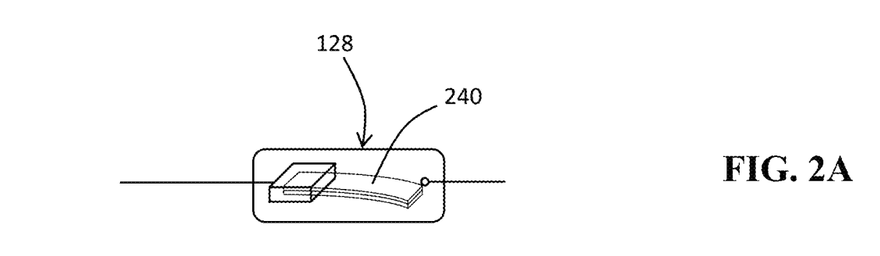
FIG. 2A illustrates a schematic diagram of a timer switch of the example battery charger of FIG. 1 in a first position, in accordance with embodiments of the present disclosure.

For example, as shown in FIG. 2A, in at least one embodiment of the present disclosure, at its initial temperature and in its initial position, the bimetallic strip 240 causes the timer device 128 to be in the closed state. When a device 104 is connected to the output power connector 120 and the relay circuit 132 is completed, the heat generated by the electrical current passing through the timer device 128 causes the bimetallic strip 240 to bend relative to its initial position. The predetermined amount of time is equal to the amount of time that it takes for the bimetallic strip 240 to bend far enough relative to its initial position that the timer device 128 is in the open state, shown in FIG. 2B. Once the timer device 128 is in the open state and the relay circuit 132 is made incomplete, current no longer passes through the timer device 128. Accordingly, the bimetallic strip 240 cools and returns to its initial position, shown in FIG. 2A, returning the timer device 128 to the closed state.

Figure 2B:
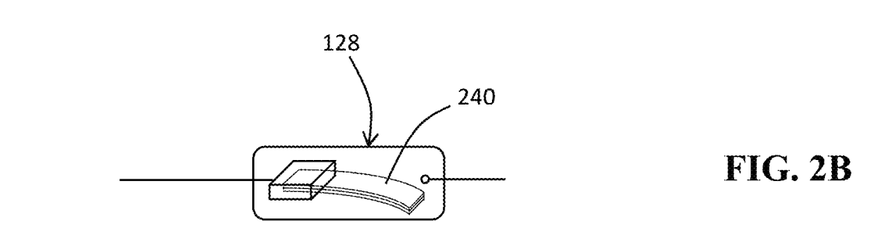
FIG. 2B illustrates a schematic diagram of a timer switch of the example battery charger of FIG. 1 in a second position, in accordance with embodiments of the present disclosure.

In the context of the illustrative embodiment described above, the predetermined amount of time can be, for example, approximately fifteen minutes. In such embodiments, the materials of the bimetallic strip 240 are selected such that, once subjected to the heat generated by the electrical current passing through the timer device 128, it takes approximately fifteen minutes for the bimetallic strip 240 to bend far enough relative to its initial position that the timer device 128 is in the open state. In alternative embodiments, it is possible for the predetermined amount of time to be greater than or less than fifteen minutes. In such embodiments, the bimetallic strip 240 are selected such that the timer device 128 operates in the manner described above with respect to the predetermined amount of time.

Additionally, in the context of the illustrative embodiment described above, the amount time that it takes for the bimetallic strip 240 to cool and return to its initial position once the timer device 128 is in the open state corresponds to the reset time that the relay circuit 132 will remain disconnected before it is reconnected automatically in the manner described above. More specifically, even if the device 104 is still connected to the output power connector 120, once the predetermined amount of time has elapsed and the bimetallic strip 240 has bent far enough relative to its initial position that the timer device 128 is in the open state, the relay circuit 132 cannot be reconnected until the bimetallic strip 240 has cooled enough to return to its initial position. In some embodiments of the present disclosure, the time that it takes for the bimetallic strip 240 to cool and return to its initial position is approximately a few seconds. In alternative embodiments, it is possible for the time to be greater or less than approximately a few seconds. Accordingly, the reset time is controllable by the selection of materials for the bimetallic strip 240.

In alternative embodiments of the present disclosure, it is possible for the timer device 128 to include an electromechanical switch or a purely electronic artifact rather than the bimetallic strip. In such embodiments, the electromechanical switch or electronic artifact is configured such that the default state of the timer device 128 is on. Furthermore, in such embodiments, the electromechanical switch or electronic artifact is configured such that once the predetermined amount of time has elapsed from the completion of the relay circuit 132, the timer device 128 automatically turns off. Furthermore, in such embodiments, the electromechanical switch or electronic artifact is configured such that once the reset time has elapsed from the disconnection of the timer device 128, the timer device 128 returns to the on state.

Returning now to FIG. 1, the battery charger 100 further includes a manually operated power button 144, which is physically accessible via a housing 148 of the battery charger 100. The manually operated power button 144 provides an alternative mechanism for displacing the armature 126 of the power control relay 124. In particular, the manually operated power button 144 is physically displaced by a user to bring the armature 126 into contact with the contacts 127a, 127b to complete the secondary circuit 136 and connect the power source 112 with the device 104. The manually operated power button 144 is useful if, for example, the device 104 does not have sufficient energy stored in its rechargeable battery to cause current to pass through the solenoid 125 of the power control relay 124 and automatically reconnect the power source 112 to the device 104. In such instances, the manually operated power button 144 can serve to override the automatic reconnection provided by the relay circuit 132 and instead provide a manual reconnection.

In alternative embodiments of the present disclosure, the manually operated power button 144 can be replaced with a different structure or mechanism that provides an alternative mechanism for displacing the armature 126 of the power control relay 124. For example, in some embodiments, a mechanism that generates a charge, such as a piezoelectric device, can be used to provide an alternative mechanism for displacing the armature 126 of the power control relay 124.

In the illustrative embodiment discussed herein, the manually operated power button 144 is a push-button that is movable between an extended position and a depressed position. The default position of the manually operated power button 144 is the extended position. Depressing the manually operated power button 144 moves the manually operated power button 144 from the extended position to the depressed position. In the depressed position, the manually operated power button 144 forces the armature 126 into contact with the contacts 127a, 127b to complete the secondary circuit 136. Once the secondary circuit 136 is completed, current can flow from the power source 112 to the device 104. Additionally, once the secondary circuit 136 is completed, current can also flow through the relay circuit 132 and the solenoid 125 to maintain the contact between the armature 126 and the contacts 127a, 127b after the manually operated power button 144 is released and returns to the extended position. Once the device 104 has enough energy to complete the relay circuit 132, the battery charger 100 operates in the manner discussed above. In the illustrative embodiment discussed herein, the manually operated power button 144 is automatically returned to the default, extended position upon release, such as for example, by a spring.

In practice, use of the manually operated power button 144 will likely be required infrequently, if at all. For example, in the case of a device 104 having a lithium-ion battery, for safety reasons, a lithium-ion battery is designed to always retain a charge of at least 3 volts. Accordingly, even when the charge in the rechargeable battery is insufficient to operate the device 104, the charge is sufficient to complete the relay circuit 132. In the rare instance that the charge in the rechargeable battery is insufficient to complete the relay circuit 132, the manually operated power button 144 can be used to initially complete the relay circuit 132.

Figure 3:
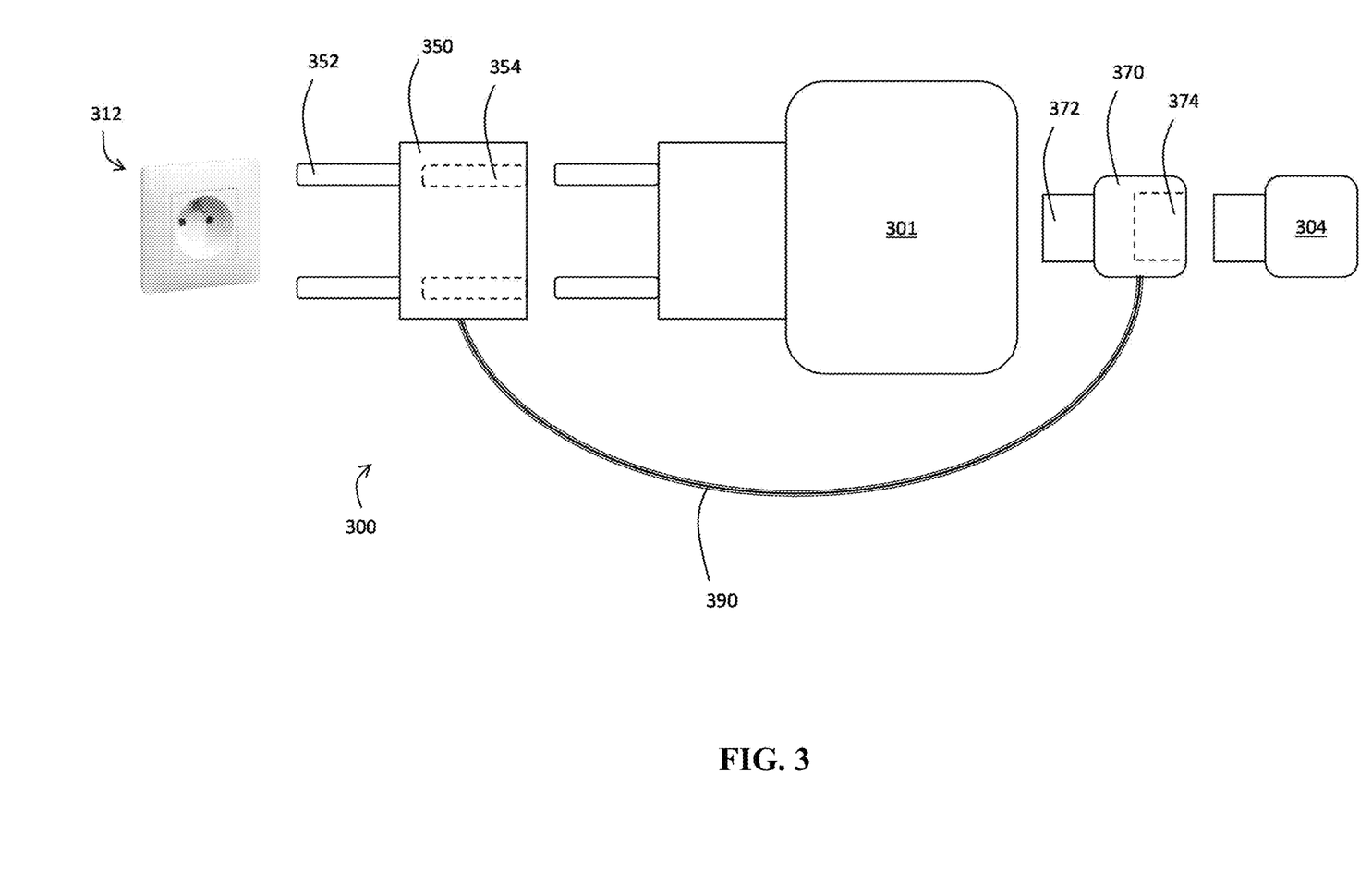
FIG. 3 illustrates a schematic diagram of an example battery charger, in accordance with embodiments of the present disclosure.

FIG. 3 depicts a battery charger 300 according to some illustrative embodiments of the present disclosure. The battery charger 300 is substantially similar in structure and function to the battery charger 100 described above. The battery charger 300 is different from the battery charger 100, however, in that the battery charger 300 does not include a power converter. More specifically, while the battery charger 100 includes the power converter 108, the battery charger 300 is instead configured to be used with an independent, preexisting power converter 301. Such embodiments are advantageous because they enable the functionality of the battery charger 300 to be added to a preexisting power converter 301 that a user already owns. Moreover, in such instances, the battery charger 300 may be configured for use with a variety of preexisting power converters 301 to improve its versatility.

As discussed in further detail below, in order for the battery charger 300 to complete the relay circuit via connection to a device and to enable disconnection of the secondary circuit between the power source and the power converter, the battery charger 300 is arranged in two separate housings rather than the single housing 148 of battery charger 100.

In the illustrative embodiment depicted in FIG. 3, the battery charger 300 includes a first housing 350 and a second housing 370 which are physically and electrically connected together by a housing connector 390. The first housing 350 is configured to connect the power source 312 to the preexisting power converter 301, and the second housing 370 is configured to connect the preexisting power converter 301 to the device 304. Accordingly, the first housing 350 has a first input power connector 352 configured to be plugged into the power source 312 and a first output power connector 354 configured as a socket for the plug of the preexisting power converter 301. Similarly, the second housing 370 has a second input power connector 372 configured to be plugged into the preexisting power converter 301 and a second output power connector 374 configured as a socket to receive the plug of the device 304.

The battery charger 300 is configured to operate in substantially the same manner as the battery charger 100 described above. Accordingly, the battery charger 300 includes a relay circuit and a secondary circuit. The components of the relay circuit and the secondary circuit can be arranged in either of the first housing 350 and the second housing 370 so long as completion of the secondary circuit via the device 304 enables automatic completion of the relay circuit and disconnection of the secondary circuit via the timing device causes automatic disconnection of the relay circuit between the power source 312 and the preexisting power converter 301 in the same manner as described above with respect to the battery charger 100.

For example, in at least one embodiment of the present disclosure, the power control relay, the timer device, and the manually operated power button, substantially similar to those described above with respect to the battery charger 100, are all arranged within the first housing 350. With respect to the relay circuit, the housing connector 390 is configured to provide electrical connection of the second output power connector 374, which are included in the second housing 370, to the power control relay and the timer device, which are included in the first housing 350. Accordingly, when the device 304 is connected to the second output power connector 374 of the second housing 370, the relay circuit is completed through the power control relay and the timer device in the first housing 350 by way of the housing connector 390.

The physical arrangement of the power control relay in the first housing 350, which is connected between the power source 312 and the preexisting power converter 301 facilitates connection and disconnection of the power source 312 with the preexisting power converter 301. Additionally, the physical arrangement of the manually operated power button on the first housing 350 further facilitates connection of the power source 312 with the preexisting power converter 301.

The second output power connector 374 can be connected to the device 304 directly or can be connected to the device 304 indirectly via a standard charging cable. In embodiments wherein the second output power connector 374 is connected to the device 304 via a standard charging cable, the battery charger 300 is configured to be used with a preexisting power converter 301 and a standard charging cable to add the functionality of automatically disconnecting the power source 312 from the preexisting power converter 301 after the predetermined amount of time has elapsed. Accordingly, as discussed above, because the power source 312 is not reconnected to the preexisting power converter 301 when the device 304 is no longer connected to the second output power connector 374, the battery charger 300 adds the functionality of saving power when the device 304 is no longer connected for charging.

In at least one embodiment of the present disclosure, a kit can include the battery charger 300 in addition to an independent power converter 301. The kit can also include at least one standard charging cable. Such embodiments are advantageous because they enable the independent power converter 301 to be used with or without the battery charger 300. Accordingly, in such embodiments, the kit includes the battery charger 300 which is configured to be used in conjunction with the independent power converter 301. More specifically, as set forth above, the battery charger 300 includes the first housing 350 and the second housing 370. The first housing 350 includes the first output power connector 354, which is configured to fit matingly with the preexisting power converter 301 to connect the preexisting power converter 301 to the power source 312. The second housing 370 includes the second input power connector 372, which is configured to fit matingly with the preexisting power converter 301 to connect the preexisting power converter 301 to the device 304. The further elements and functions of the battery charger 300 are the same as those described in further detail above.

Figure 4:
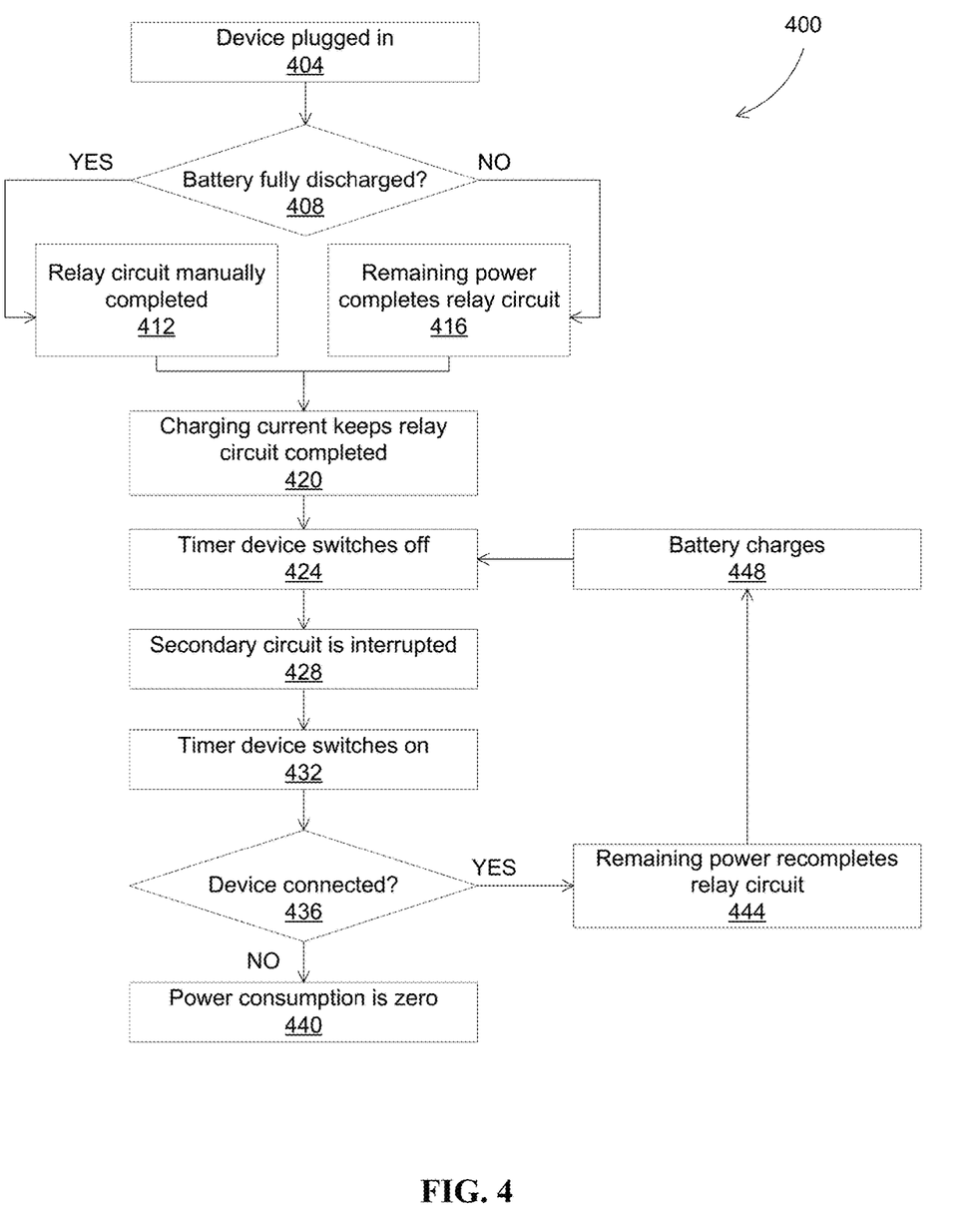
FIG. 4 illustrates a flowchart of an example method for operating a battery charger, in accordance with embodiments of the present disclosure.

Turning now to FIG. 4, a flowchart depicts a method 400 of operating a battery charger, such as for example, battery charger 100 or battery charger 300. Notably, the method 400 presupposes that the battery charger is connected to a power source and remains connected to the power source throughout the performance of the method 400.

At operation 404, a device is plugged into an output power connector. In the illustrative example of battery charger 100, the device 104 is plugged into the output power connector 120.

At operation 408 it is determined whether the rechargeable battery of the device is fully discharged. In other words, in the context of the illustrative example of battery charger 100, at operation 408 it is determined whether the rechargeable battery of the device 104 has enough stored energy remaining to complete the relay circuit 132.

At operation 408, if the rechargeable battery of the device is fully discharged (i.e., it does not have enough stored power remaining to complete the relay circuit 132) ("YES"), then at operation 412, a user operates the manually operated power button 144 to force the power control relay 124 to connect the input power connector 116 to the power converter 108. Conversely, if the rechargeable battery of the device is not fully discharged (i.e., it does have enough stored power remaining to complete the relay circuit 132) ("NO"), then at operation 416, the remaining power in the device 104 completes the relay circuit 132, thereby activating the power control relay 124 and connecting the input power connector 116 to the power converter 108.

According to at least some embodiments of the present disclosure, operation 408 can include observation of whether the connected device begins charging. If the connected device does begin charging automatically, then it must be true that the rechargeable battery of the device did have sufficient stored power remaining to complete the relay circuit 132. Thus, the battery was not fully discharged ("NO"). Conversely, if the connected device does not begin charging automatically, then it must be true that the rechargeable battery of the device did not have sufficient stored power remaining to complete the relay circuit 132. Thus, the battery was fully discharged ("YES"). In alternative embodiments, it is possible to make the determination in another manner.

Whether the battery was fully discharged and the armature 126 of the power control relay 124 was displaced manually or the battery was not fully discharged and the armature 126 of the power control relay 124 was displaced by the flow of current through the power control relay 124, at operation 420, once the relay circuit 132 has been completed, thus completing the secondary circuit 136, the current that is transmitted from the power source 112 to the device 104 is sufficient to keep the relay circuit 132 completed. In other words, at operation 420, the charging current maintains the flow of current through the solenoid 125 of the power control relay 124 and thus maintains the connection between the input power connector 116 and the power converter 108 via the armature 126.

At operation 424, after the predetermined amount of time has elapsed from the connection of the relay circuit 132, the timer device 128 interrupts the relay circuit 132. Accordingly, at operation 428, because current no longer flows through the solenoid 125 of the power control relay 124, the armature 126 returns to its initial position and the secondary circuit 136 is also interrupted. In other words, at operation 428, the power control relay 124 is turned off. Notably, at operation 428, the secondary circuit 136 is interrupted whether or not the device 104 is still connected to the output power connector 120.

At operation 432, after the reset time has elapsed from the interruption of the relay circuit 132, the timer device 128 returns to its initial position and returns the timer device 128 to the closed state. Like operation 428, the timer device 128 returns to its initial position whether or not the device 104 is still connected to the output power connector 120.

At operation 436 it is determined whether or not the device 104 is connected to the output power connector 120. If the device 104 is not connected to the output power connector 120 ("NO"), then at operation 440, the relay circuit 132 is not completed, thus the secondary circuit 136 is not completed, thus the input power connector 116 is not connected to the power converter 108, and zero power is consumed by the power converter 108. Accordingly, at operation 440, zero power from the power source 112 is wasted.

Conversely, if the device 104 is connected to the output power connector 120 ("YES"), then at operation 444, the power stored in the rechargeable battery of the device 104 reestablishes the completion of the relay circuit 132, which reestablishes the completion of the secondary circuit 136, which reestablishes the connection of the power source 112 to the power converter 108 via the input power connector 116. Accordingly, at operation 448, the battery of the device 104 continues to be charged with power from the power source 112. In such instances, after the predetermined amount of time has elapsed from the reestablishment of the completion of the relay circuit 132, the method 400 returns to operation 424, wherein the timer device 128 interrupts the relay circuit 132.

According to at least some embodiments of the present disclosure, operation 436 can include observation of whether charging is resumed. If charging is automatically resumed, then it must be true that the device 104 was connected ("YES"). Conversely, if the charging is not automatically resumed, then it must be true that the device 104 was not connected ("NO"). In alternative embodiments, it is possible to make the determination in another manner.

In addition to embodiments described above, other embodiments having fewer operational steps, more operational steps, or different operational steps are contemplated. Also, some embodiments may perform some or all of the above operational steps in a different order. Furthermore, multiple operations may occur at the same time or as an internal part of a larger process. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

As used herein, "a number of" when used with reference to items, means one or more items. For example, "a number of different types of networks" is one or more different types of networks.

When different reference numbers comprise a common number followed by differing letters (e.g., 100*a*, 100*b*, 100*c*) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A battery charger, comprising:
a power converter;
an input power connector configured to be connected to a power source such that the input power connector is arranged between the power converter and the power source;
an output power connector configured to be connected to an electronic device such that the output power connector is arranged between the power converter and the electronic device;
a power control relay including a solenoid and an armature, the power control relay configured such that the armature connects the power converter to the input power connector when current is passed through the solenoid; and
a timer device configured to disconnect the power converter from the input power connector after a predetermined amount of time has elapsed, wherein:
connecting the output power connector to the electronic device causes current to pass through the timer device, and
passing current through the timer device causes current to pass through the solenoid.

2. The battery charger of claim 1, wherein:
the predetermined amount of time is measured from the connection of the power converter to the input power connector.

3. The battery charger of claim 1, wherein:
the power control relay connects the power converter to the input power connector when current passes through the power control relay.

4. The battery charger of claim 1, wherein:
the timer device prevents current from passing through the power control relay after the predetermined amount of time has elapsed.

5. The battery charger of claim 1, further comprising:
a mechanical switch connected to the power control relay, the mechanical switch configured to force the power control relay to connect the power converter to the input power connector.

6. The battery charger of claim 1, wherein:
the timer device includes a bimetallic strip.

7. The battery charger of claim 1, wherein:
a first circuit of the battery charger includes the power control relay, the timer device, and the output power connector,
a second circuit of the battery charger includes the input power connector, the power control relay, the power converter, and the output power connector,
the first circuit is completed when the output power connector is connected to the device, and
completion of the first circuit causes the second circuit to be completed automatically when the input power connector is connected to the power source.

8. The battery charger of claim 7, wherein:
disconnection of the first circuit causes the second circuit to be disconnected automatically.

9. The battery charger of claim 7, wherein:
completion of the first circuit causes the power control relay to connect the input power connector to the power converter.

10. The battery charger of claim 7, wherein:
the timer device causes the first circuit to be disconnected after the predetermined amount of time has elapsed relative to the completion of the first circuit.

11. A method of operating a battery charger, the method comprising:
establishing a connection between a power source and an input power connector of a power converter by passing current from a device through a power control relay, wherein:
passing current from the device through the power control relay includes connecting an output power connector of the power converter to the device,
the power control relay includes a solenoid and an armature configured such that the armature connects the power converter to the input power connector when current is passed through the solenoid,
establishing the connection includes passing current through a timer switch,
passing current through the timer switch causes current to pass through the solenoid, the timer switch is configured to open after current has passed through the timer switch for a predetermined amount of time, and opening the timer switch disconnects the power source from the input power connector of the power converter.

12. The method of claim 11, wherein:

opening the timer switch prevents current from passing through the power control relay.

13. The method of claim 11, wherein:

establishing the connection includes connecting the battery charger to the device.

14. The method of claim 13, wherein:

establishing the connection includes manually moving the power control relay to enable current to pass therethrough between the power source and the input power connector of the power converter.

15. A method of operating a battery charger, the method comprising:

disconnecting a power source from an input power connector of a power converter by preventing current from passing from a device through a power control relay to the power converter, wherein:

the power control relay includes a solenoid and an armature, the power control relay configured such that the armature connects the power source and the input power connector of the power converter when current is passed through the solenoid, a timer switch is arranged in series with the power control relay such that the timer switch prevents current from passing through the power control relay when the timer switch is opened, connecting an output power connector of the power converter to the device causes current to pass through the timer switch, and passing current through the timer switch causes current to pass through the solenoid.

16. The method of claim 15, wherein:

the timer switch is opened after a predetermined amount of time has elapsed, and the predetermined amount of time begins when the power source is connected to the input power connector of the power converter.

17. The method of claim 15, further comprising:

closing the timer switch after a reset time has elapsed, wherein the reset time begins when the timer switch is opened, wherein closing the timer switch reconnects the power source to the input power connector of the power converter when the battery charger is connected to the device.

18. A battery charger, comprising:

a power control relay including a solenoid and an armature, the armature movable between a first position and a second position, wherein when the armature is in the first position, the power control relay connects a power source to an input power connector of a power converter, and wherein when the armature is in the second position, the power control relay prevents connection of the power source to the input power connector of the power converter; and a timer switch movable between a third position, whereat the timer switch enables current to pass through the solenoid, and a fourth position, whereat the timer switch prevents current from passing through the solenoid, wherein:

connecting an output power connector of the power converter to a device causes current to pass through the timer switch, passing current through the timer switch causes current to pass through the solenoid, passing current through the solenoid causes the armature to move to the first position, the timer switch moves from the third position to the fourth position after a predetermined amount of time has elapsed, the predetermined amount of time beginning when the armature is moved into the first position.

19. The battery charger of claim 18, wherein:

the timer switch moves from the fourth position to the third position after a reset amount of time has elapsed, the reset amount of time beginning when the timer switch moves from the third position to the fourth position.

20. The battery charger of claim 18, further comprising:

a manually operated power button configured to move the power control relay from the second position to the first position.

* * * * *